April 21, 1925.

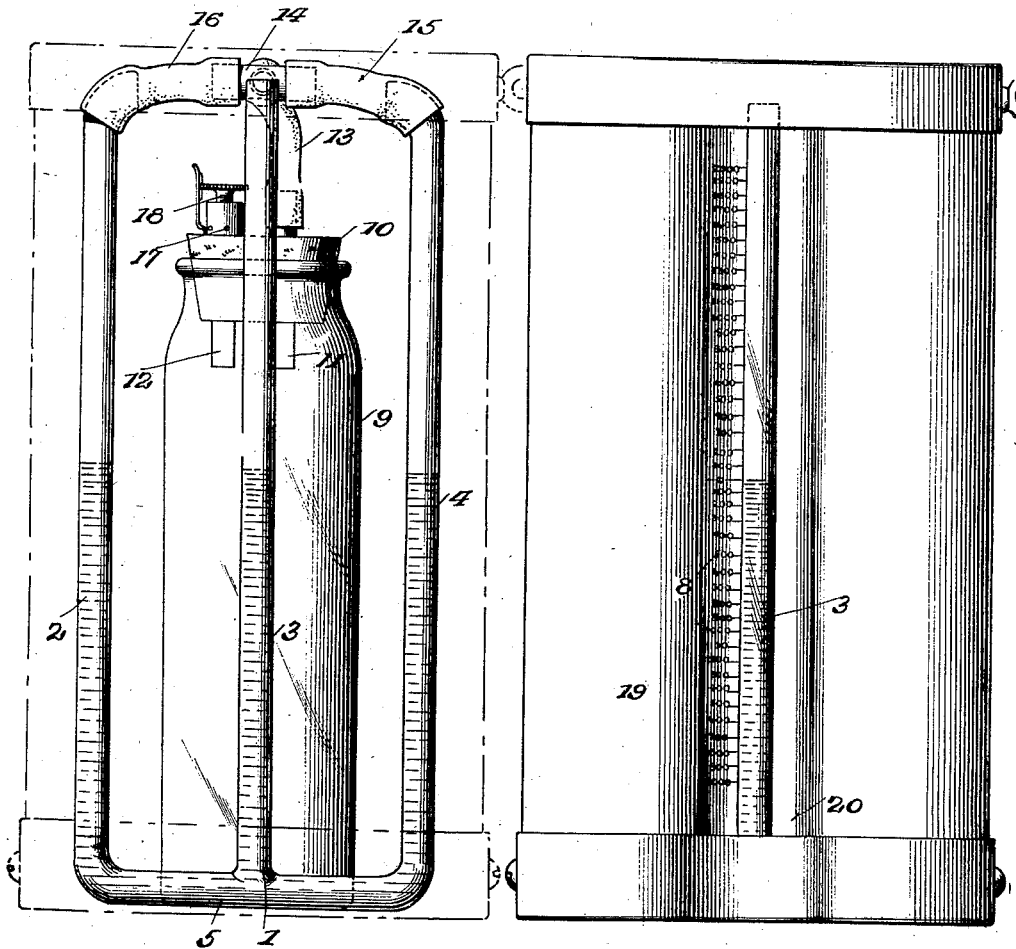

A. H. FOSTER 1,534,206

RATE OF CLIMB INDICATOR FOR AIRCRAFT

Filed Sept. 22, 1920      2 Sheets-Sheet 2

Patented Apr. 21, 1925.

1,534,206

UNITED STATES PATENT OFFICE.

ANGIER H. FOSTER, OF OMAHA, NEBRASKA.

RATE-OF-CLIMB INDICATOR FOR AIRCRAFT.

Application filed September 22, 1920. Serial No. 411,993.

*To all whom it may concern:*

Be it known that I, ANGIER H. FOSTER, a citizen of the United States, residing at Omaha, in the county of Douglas and State of Nebraska, have invented certain new and useful Improvements in Rate-of-Climb Indicators for Aircraft, of which the following is a specification.

My invention relates to rate-of-climb indicators for aircraft and particularly to those of the capillary leak tube type having a liquid manometer indicating mechanism.

In the known devices of this type the indicating mechanism will not give an accurate zero reading when the instrument is tipped to one side or the other due to the position of the aircraft on which it is used.

It is my object to provide an indicator which will give accurate zero readings regardless of any tipping.

A further object is to provide an indicator of such simple construction that it may be manufactured at much lower cost than the devices now in use.

The invention is shown in detail in the accompanying drawings, in which:

Fig. 1 is a front elevation of the device without the case;

Fig. 3 is front elevation of the complete indicator in its case;

Figure 4:
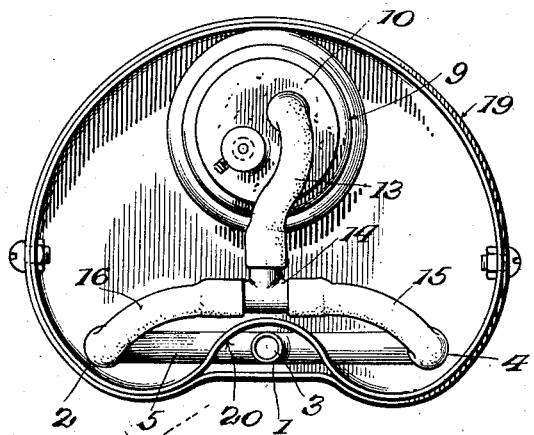
Fig. 4 is a plan view of the same with the cover of the case removed.

The device comprises essentially an indicating mechanism proper, an atmospheric air container, a capillary leak tube and regulating means therefor, and means for establishing communication between these three elements.

The indicating mechanism is of the liquid manometer type and is designated in the drawings by the numeral 1. Unlike the usual U-tube construction, it has three vertical tubes, 2, 3, and 4 which rise from the horizontal connecting tube 5. The construction is integral and preferably made from glass tubing. The indicating liquid within the tubes is thus disposed in three intercommunicating columns. The outer tubes 2 and 4 are provided with anti-leak valves 6 and 7 respectively to prevent leakage of the indicating liquid should the instrument become inverted. The upper end of tube 3 is open to the atmosphere and liquid cannot escape upon inversion because the tubes 2 and 4 are sealed by the anti-leak valves. A reading scale 8 extends along the central tube 3 and is calibrated in terms of feet per minute ascent or descent above or below a zero point.

The atmospheric air container 9 can conveniently and inexpensively be made from a large-necked bottle. A rubber stopper 10 is fitted in the neck of the bottle and two tubes 11 and 12 penetrate this stopper so as to be in communication with the interior of the bottle.

The outer end of tube 11 is connected by a rubber tube 13 with one arm of a T-tube 14. The other two arms of the T-tube are connected by rubber tubes 15 and 16 with the upper ends of indicator tubes 2 and 4 respectively.

Figure 2:
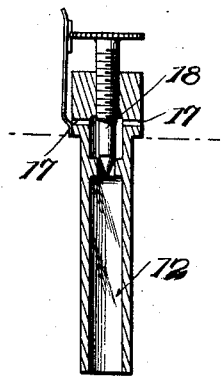
Fig. 2 is a detail sectional view of the capillary leak tube.

The tube 12 constitutes the capillary leak tube and is shown in detail in Fig. 2. The capillary vents 17 are controlled by the adjustable needle-valve 18.

The assembled parts of the indicator may be housed in the case 19 disclosed in Figs. 3 and 4. This case has a vertical channel 20 formed by an indentation in its front wall. The central tube alone of the indicator extends through channel 20 and the reading-scale is also disposed in this channel. The tube and scale are thus exposed to view, whereas all the other parts are concealed within and protected by the case.

Figure 5:
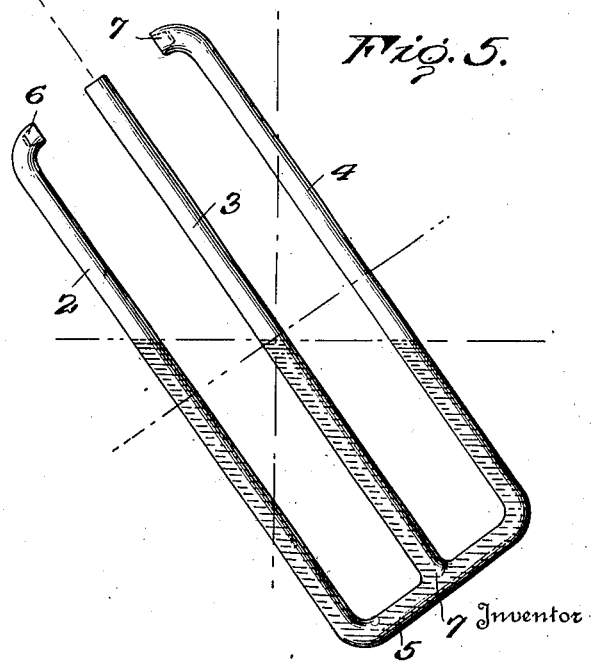
Fig. 5 is a front elevation of the indicating mechanism proper in a tipped position.

In the well-known U-tube indicator, the reading-scale extends along one of the two branches of the tube and will give accurate readings only when the instrument is upright in position. That is because tipping of the instrument materially affects the relative heights of liquid in both branches. In my indicator, the liquid heights in the outside tubes 2 and 4 will become quite different when tipped as shown in Fig. 5, but the liquid level in the central tube remains practically the same throughout a tipping of 30 degrees or less. The scale can be read quite accurately. By having the division lines of the scale partly encircle the tube as shown in Fig. 3, the mean height of the liquid may be determined with precision regardless of the particular direction in which the instrument is tipped.

The operation of the device will be discussed briefly since the principle upon which it is based is already well known. As the aircraft upon which the instrument is used ascends or descends at some given rate of speed, the pressure of the external air is changing at a nearly constant rate, but the pressure inside the air container will lag behind that of the external air, due to the resistance offered to the equalization of pressure by the capillary leak tube. This causes a pressure difference which is proportionate to the rate of ascent or descent and is measured by the indicating mechanism. From the direct reading scale the rate of ascension or descension can be read in terms of feet per minute. When the aircraft ceases to climb or to descend, the pressure within the air container and that of the external air come into equilibrium and the indicator registers zero.

Due to the simple construction which I have devised, the indicator can be manufactured at much lower cost than the more intricate devices now in practical use. This is considered to be a feature of decided utility.

What I claim is:

1. In a rate-of-climb indicator for aircraft, the combination of a liquid-containing transparent indicator tube having two side branches and a third intermediate branch arranged in substantial parallelism therewith and in direct communication with the atmosphere, a reading scale associated with the intermediate tube branch, an air container in communication with the indicator tube, and means for establishing communication between the air container and the atmosphere through a restricted aperture.

2. In a rate-of-climb indicator for aircraft, the combination of a liquid-containing transparent indicator tube having two side branches and a third intermediate branch arranged in substantial parallelism, the intermediate tube branch being in direct communication with the atmosphere, a reading scale associated with the said intermediate branch, an air container in communication with the side tube branches, and means for establishing communication between the air container and the atmosphere through a restricted aperture.

3. An indicator for fluid-pressure responsive devices comprising a liquid-containing transparent tube having two side branches and a third intermediate branch arranged in substantial parallelism, said branches being freely intercommunicating at all times, and a reading scale associated with the said intermediate branch.

4. An indicator for fluid-pressure responsive devices, comprising a liquid-containing transparent tube having two side branches and a third intermediate branch arranged in substantial parallelism, said branches being freely intercommunicating at all times, and a reading scale associated with the said intermediate branch and having calibration lines partially encompassing the tube.

5. In a rate-of-climb indicator for aircraft, the combination of a liquid-containing transparent indicator tube having two side branches and a third intermediate branch arranged in substantial parallelism therewith and in direct communication with the atmosphere, a reading scale associated with the intermediate tube branch, an air container in communication with the indicator tube, and a capillary leak tube connecting the air container with the atmosphere.

6. In a rate-of-climb indicator for aircraft, the combination of a liquid-containing transparent indicator tube having two side branches and a third intermediate branch arranged in substantial parallelism vertically and interconnected at their lower ends, the upper end of the said intermediate branch being open to the atmosphere, means provided at the upper ends of the said side branches for automatically sealing the side branches against fluid passage upon inversion of the indicator, an air container, means for connecting the air container with the upper ends of the side branches of the indicator tube, and means for establishing communication between the air container and the atmosphere through a restricted aperture.

7. In a rate of climb indicator for aircraft, the combination of a pressure responsive means, indicating means comprising three inter-communicating tubes in substantial parallelism, and indicating means so arranged as to function therewith accurately irrespective of the inclination of the aircraft in flight.

8. In a rate-of-climb indicator for aircraft, the combination of a liquid-containing transparent indicator tube having two side branches and a third intermediate branch arranged in substantial parallelism therewith and open to the atmosphere, a casing containing the side branches of the indicator tube and having an exterior channel through which the intermediate branch extends, a reading scale disposed in the said channel of the case in suitable proximity to the tube branch extending therethrough, an air container in communication with the indicator tube, and means for establishing communication between the air container and the outside air through a restricted aperture.

In testimony whereof I have affixed my signature.

ANGIER H. FOSTER.